United States Patent [19]

Ripley et al.

[11] 4,327,011
[45] Apr. 27, 1982

[54] PRINTING INK AND VEHICLE THEREFOR

[75] Inventors: Robert H. Ripley, Grand Rapids; Robert W. Karsten, Zeeland, both of Mich.; Eugene M. Brandon, Marlton, N.J.; James W. Lockerby, Downers Grove, Ill.

[73] Assignee: Century Inks Corporation, Park Ridge, Ill.

[21] Appl. No.: 226,392

[22] Filed: Jan. 19, 1981

Related U.S. Application Data

[63] Continuation-in-part of Ser. No. 96,193, Nov. 20, 1979, abandoned.

[51] Int. Cl.$^3$ ............................................. C08K 5/01
[52] U.S. Cl. ................................................... 524/474
[58] Field of Search ............ 260/33.6 UA; 526/329.2; 106/32

[56] References Cited

U.S. PATENT DOCUMENTS 3,262,919 7/1966 Bolgiano .................... 260/33.6 UA
3,413,250 11/1968 Varron et al. ............. 260/33.6 UA
3,489,712 1/1970 Leveskis ....................... 260/33.6 R Primary Examiner—Lewis T. Jacobs
Attorney, Agent, or Firm—Price, Heneveld, Huizenga & Cooper

[57] ABSTRACT

A heat-setting printing ink capable of setting to a stable condition at unusually low temperatures, resulting in time and energy savings for web offset lithographic printing, while effecting superior image integrity or printing quality. The novel lithographic printing ink employs a unique styrene-acrylic copolymer composition, which is dissolved in a low solvency aliphatic hydrocarbon, this being the basic vehicle for the ink. This vehicle exhibits not only a more rapid rate of film formation during drying, but at room temperatures the rate is less than conventional vehicles so as to exhibit good press stability in the roller train. The ink achieves these results without sacrificing other features characteristics of known high quality web offset inks. The ink is formed by blending this special vehicle with other ink composition ingredients including pigments, optionally a conventional let down varnish, a minor amount of additives such as waxes for surface characteristics, and solvent for flow characteristics.

14 Claims, 4 Drawing Figures

PRINTING INK AND VEHICLE THEREFOR

RELATED APPLICATION

This application is a continuation-in-part application of copending application Ser. No. 096,193 entitled PRINTING INK AND VEHICLE THEREFOR, filed Nov. 20, 1979 by the applicants herein and now abandoned.

BACKGROUND OF THE INVENTION

This invention relates to a printing ink and vehicle for offset heat-set litographic printing.

In recent years, there has been a growing trend to use offset lithographic printing techniques to print on web stock as opposed to sheet stock. Because of the continuous nature of the web stock, the potential exists for significantly greater production output through the printing and drying equipment. Frequently, two or more colors are successively applied to the web, each color being printed in register and set by application of sufficient heat followed by cooling to enable the next process step such as sheeting or folding to be immediately performed. To achieve high quality printing in this process requires the applied inks to exhibit very high gloss level, rub-resistance, excellent transfer and blanket release, and sharp print quality, as is known to those in the trade.

Achieving these results necessitates reaching a web temperature of at least 250°–260° F. when operating at a line speed of 600 feet per minute, to dry the ink sufficiently before the web advances to the chilling stage, so that the ink does not transfer and build up on the folders, formers, and guide wheels used at the output end of the press. These web temperatures and/or line speeds are representative and could be higher or lower depending on ink coverage. The cost of heat energy to do this is substantial. If the drying temperature could be lowered or if the line speed increased, the energy savings could be large. As far as is known, this has not heretofore been accomplished, however. Further, although decreasing drying temperatures necessary is desirable, it is also important to maintain good print quality. Moreover, if an ink with lower potential drying temperatures, i.e. higher drying rates were to be developed, the more rapid rate of solvent evaporation would be expected to occur not only in the elevated temperature dryer, but also on the ink feed train of the press. This latter effect cannot be tolerated.

SUMMARY OF THE INVENTION

The present invention provides a heat-setting printing ink, and a printing ink vehicle, for offset lithographic printing of web stock, exhibiting high quality printing characteristics coupled with significantly lower drying temperature setting characteristics. The novel ink has high gloss level, rub-resistance, excellent transfer and blanket release, and sharp print quality, coupled with the characteristic of heat-setting capacity at web temperatures of 28-35% lower than conventional "low energy" inks. This can result in substantial potential energy savings.

The novel ink vehicle, and resulting ink made therewith, also possesses the unique characteristic of having a lower rate of solvent loss at room temperatures, resulting in good stability on the ink feed train, yet having a higher rate of solvent release at elevated temperatures to enable more rapid drying subsequent to printing. This capacity for more rapid drying not only saves energy, but it reduces the time during which the printed ink dots spread, thereby improving the sharpness of the print.

The ink formulation is based on a vehicle with a special low molecular weight styrene-acrylic copolymer composition that is soluble in low solvency aliphatic hydrocarbons. This solubility characteristic of the resin enables its use in the lithography process, even on web stock. This vehicle has a water-clear nature so as to retain the full color brilliance of the pigments used in the ink.

The novel vehicle and ink are capable of a higher than normal ratio of solids to solvent, so that less solvent need be evaporated from the printed ink. This allows heat energy savings and results in less hydrocarbon pollution in the atmosphere. The lower potential drying temperature also means less decomposition of ingredients and therefor less potential pollution therefrom.

The ink is composed of this vehicle plus pigments, optional conventional let down vehicles, appropriate amounts of surface characteristic additives such as waxes, and additional solvent for quality control adjustment.

The ink has the capacity to rewet itself when contacted by additional fresh ink before the drying process, a significant advantage on the press.

In the parent application hereof, the molecular weight range of 10,000–50,000 was described and claimed, the range of 15,000 to 20,000 being preferred, and below 10,000 considered too tacky. However, subsequent printing activities on certain commercial printing presses caused re-evaluation of the molecular weight range. Specifically, on presses having a speed range of 800 to 1200 feet per minute, typical ones being "full web" presses (i.e. 23 to 28 inches wide) and certain "half web" presses (i.e. 12 to 14 inches wide) lower viscosity ink within the range originally stated are appropriate, e.g. about 14,000 to 17,000 mw range. However, on higher speed presses, i.e. speeds up to about 2500 feet per minute, higher viscosity inks in the mw range below 10,000 are effective to resist higher rate of agitation and ink breakdown, excessive misting, emulsification, and poor print quality. Furthermore, since both ink train roller diameter and ink train cooling affect the amount of frictional heat in the roller train, and since such heat determines rate of loss of ink solvent, some "half web" presses with smaller diameter rollers generate more heat so that the higher viscosity ink range is more effective for them too. This re-evaluation showed that the inks in the molecular weight range below 10,000, specifically those above 4000 were in fact not too tacky for such higher speed presses, but rather were desirable. In fact, the overall preferred molecular weight range was determined to be 5000–10,000, the optimum being about 7500.

DESCRIPTION OF THE PREFERRED EMBODIMENT

Figure 1:
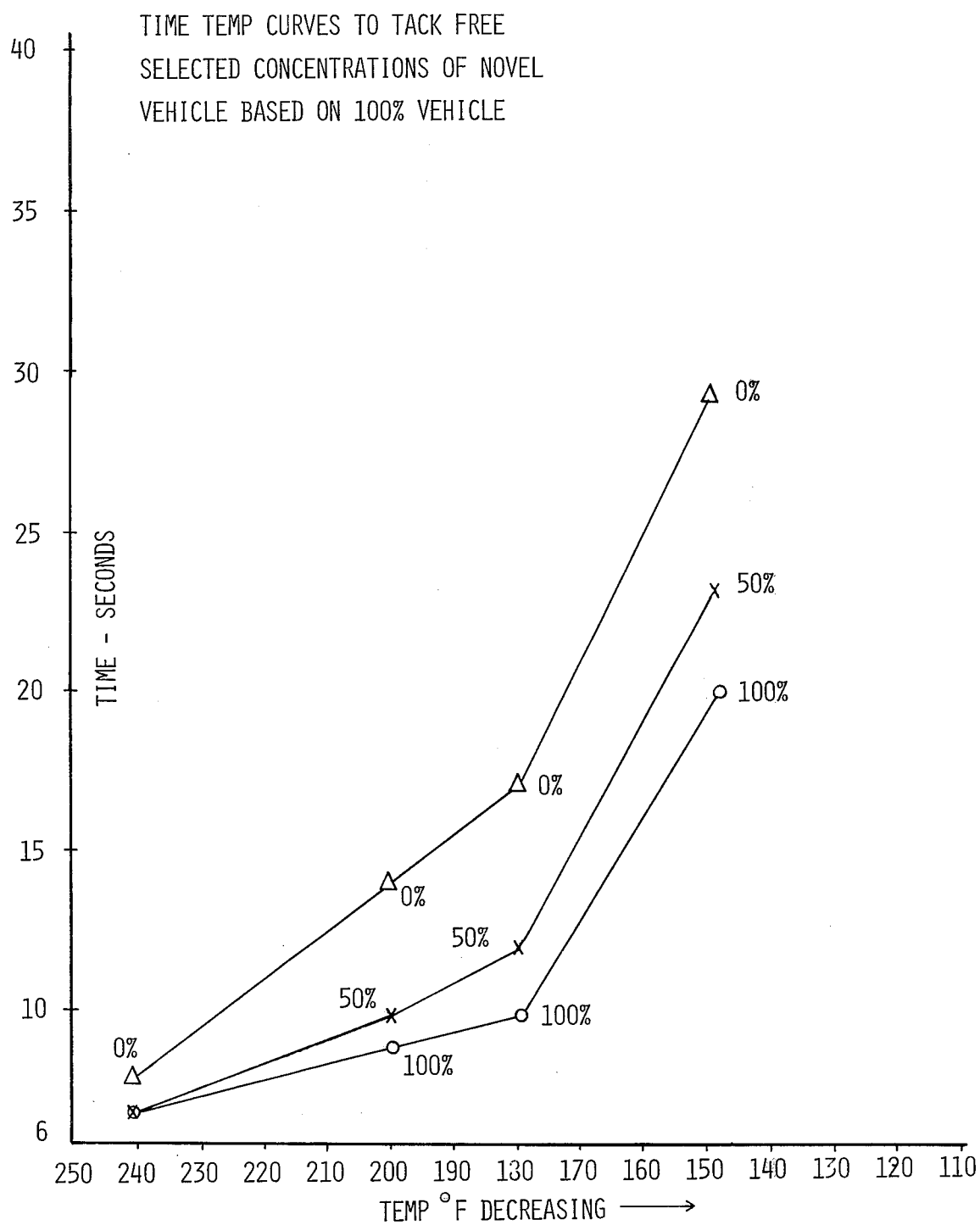

The novel printing ink, particularly suited to offset lithography printing, has unique low temperature setting or drying combined with quality printing character, from a special composition based upon an ink vehicle soluble in a low solvency aliphatic hydrocarbon. The vehicle is an acrylic-styrene copolymer with molecular weight in the 4,000-50,000 range, in an essentially aliphatic hydrocarbon solvent that boils in the range 390° F. to 595° F.

The composition of the ink consists of this polymer solution combined with appropriate color pigments, appropriate amounts of additives to enhance surface characteristics such as slip, rub resistance, and skin oil resistance. These additives may be natural or synthetic waxes, polyethylenes or Teflon powders as examples. Optionally conventional heat-set vehicles which either may or may not be gel varnishes can be added. Appropriate amounts of added solvent to adjust proper flow, body, tack and stability are added.

The preparation of the ink normally involves preparation of the styrene-acrylic copolymer solution. Then pigment is dispersed in this vehicle to form a pigment concentrate. Additives, conventional let down vehicle, and/or additional acrylic-styrene copolymer and solvent are added to the pigment concentrate to form the ink.

In outline form, the steps are as follows:

I. Preparation of Polymer Solution
1. Premix monomers comprising
   (a) about 30–63% styrene
   (b) about 37–70% of acrylate and methacrylate and alkyl vinyl benzene monomers, of which at least 25% are acrylates and methacrylates having at least $C_6$ alkyl chain length, and preferably
      0–48% 2-ethyl hexyl methacrylate 0–40% of other esters of methacrylic or acrylic acid
      0–6% methacrylic or acrylic acid
      0–20% an alkyl vinyl benzene
   and add thereto about 1 to 5 parts of a conventional free radical initiator to 100 parts of the monomers
2. Heat to about 300° F.–340° F. a low solvency solvent, essentially aliphatic hydrocarbons boiling between 390° F. and 595° F.
3. Add the monomer premix slowly to the solvent while continuing to heat to polymerize the monomers to essentially complete conversion of the monomers to a polymer with a molecular weight in the range of 4,000 to 50,000

II. Preparation of Pigment Concentrate Disperse one or more conventional color pigments into the styrene-acrylic copolymer solution III. Preparation of Ink
1. Optionally, combine with the Pigment Concentrate a controlled amount of conventional let down vehicle so that the total vehicle will be at least 25% Polymer Solution vehicle and not more than 75% of a conventional let down vehicle. Therefore the vehicle will be made up of 25–100% Polymer Solution vehicle and 0–75% conventional let down vehicle.
2. Add waxes, additives and additional solvents for control of final characteristics.

Preferably, the styrene-acrylic copolymer solution vehicle has a molecular weight in the range of 5,000 to 10,000 and formed of the following:
55–65% by weight polymer solids in 35 to 45% of a saturated aliphatic hydrocarbon solvent boiling between 440°–500° F., with 80% boiling below 475° F., such polymer solids being composed of:
   50–63% styrene, and 37 to 50% of the following components:
      35 to 48% 2-ethylhexyl methacrylate
      2 to 4% methacrylic acid To 100 parts of the monomer is added 1.7 to 2.2 parts of the free radical initiator t-butyl perbenzoate to cause polymerization of the monomer.

These individual steps and the products resulting therefrom are explained in detail hereinafter.

Polymer Solution Vehicle

The unique ink vehicle characteristics of the styrene-acrylic copolymer solution hereof result in a heat-setting printing ink possessing stability on the roller train, quicker film formation, lower energy requirements for drying, and high quality print. Stability on the roller train is due to slower than normal solvent evaporation from the ink vehicle at room, i.e. ambient temperatures and the special characteristic of the ink to redissolve in fresh ink. Quicker film forming and lower energy requirements for drying are largely due to faster than normal solvent release from the vehicle at elevated drying temperatures.

The acrylic-styrene copolymer useful for this invention has a molecular weight in the range of about 4,000 to 50,000, as measured by standard gel permeation chromatography. This is expressed as the weight average molecular weight. Below a molecular weight of about 4,000 the ink vehicle becomes excessively tacky. Above 50,000 the vehicle tends to become too viscous and loss of solvency occurs. Excessive tackiness is a detriment to handling on the press. Excessive viscosity prevents proper flow qualities. Preferably, the molecular weight range is in the range of about 5,000 to 10,000.

The polymer solution is composed of the copolymer in a particular solvent. The styrene-acrylic copolymer is soluble in aliphatic hydrocarbons typically considered low solvency type, and that have a boiling point range so as to be usually considered an "oil". The solvent is one that will boil within the broader range of about 390° F. to 595° F., and preferably a saturated aliphatic hydrocarbon which will boil within the narrower range of about 440° F.–500° F., with 80% boiling below 475° F.

Best results were obtained with a solvent known in the trade as deodorized Magie Oil 440, also known as "Magie Sol" 44. Good results were also obtained with deodorized Magie Oil 470, also known as "Magie Sol" 47. Satisfactory results were also obtained with Magie Oil 535. These can be obtained from Magie Bros. Oil Company, a subsidiary of Pennsylvania Refining Company, Franklin Park, Illinois. Typical specifications for "Magie Sol" 44 are as follows: API gravity 45.7, specific gravity 0.7985, refractive index 1.4415, flash point 210° F., color of water white, i.e. water clear, odorless, F.I.A. of saturates 100% and aromatics and olefins nil %, molecular weight 183, auto ignition temperature 530° F., and typical distillation as follows:

| | |
|---|---|
| I.B.P. | 440° F. |
| 5% | 454° F. |
| 10 | 457° F. |
| 20 | 459° F. |
| 30 | 461° F. |
| 40 | 463° F. |
| 50 | 465° F. |
| 60 | 467° F. |
| 70 | 470° F. |
| 80 | 474° F. |
| 90 | 477° F. |
| 95 | 481° F. |
| E.P. | 490° F. |

Typical specifications for "Magie Sol" 47 are as follows: API gravity 44.4, specific gravity 0.8044, refractive index 1.4440, flash point 240° F., color of water white, odorless, F.I.A. of saturates 100% and aromatics and olefins nil%, molecular weight 206, auto ignition temperature 530° F., and typical distillation as follows:

| I.B.P. | 460° F. |
| --- | --- |
| 5% | 475° F. |
| 10 | 477° F. |
| 20 | 480° F. |
| 30 | 482° F. |
| 40 | 484° F. |
| 50 | 487° F. |
| 60 | 490° F. |
| 70 | 493° F. |
| 80 | 497° F. |
| 90 | 503° F. |
| 95 | 509° F. |
| E.P. | 513° F. |

The styrene-acrylic copolymer is polymerized within this solvent from monomers which are added thereto. The styrene to acrylic ratio is controlled to a certain range to achieve the results of this invention. That is, (a) about 30 to 63% by weight styrene is mixed with (b) about 37 to 70% of acrylate and methacrylate and alkyl vinyl benzene monomers, of which at least 25% by weight are acrylates and methacrylates having at least $C_6$ alkyl chain length. Of this second type component, preferably (i) 0–48% is 2-ethyl hexyl methacrylate, (ii) 0–40% is of other esters of methacrylic or acrylic acid, (iii) 0–6% is of methacrylic or acrylic acid, and (iv) 0–20% is of an alkyl vinyl benzene. Representative of type (ii) component are ethyl acrylate, methyl methacrylate, dicyclopentadiene acrylate, butyl methacrylate 2-ethyl hexyl acrylate, n-hexyl acrylate, isodecyl methacrylate, and isobornyl acrylate. Representative of type (iv) are t-butyl styrene and vinyl toluene.

To cause addition polymerization of these components into the copolymer, a small amount of a conventional free radical initiator is added. Because such an initiator is normally dissipated into the resin, and/or is given off in the form of a gas such as carbon dioxide, and/or is dissipated into the solvent, depending upon the decomposition reaction, the small amount of initiator is herein not included as part of the weight percentage of the resin or solvent components of the ink vehicle, in order to avoid confusion. The exact amount of initiator will vary, in accordance with standard polymerization techniques, depending on the ratio of the monomers above noted, the particular initiator selected, the product molecular weight sought, and the polymerization temperature. Representative amounts are shown in the detailed examples hereinafter. Typically about 1 to 5 parts, and preferably 1.5 to 2.5 parts, of a conventional free radical intiator are added to 100 parts of the monomers. Typical initiators include cumene hydroperoxide, 2-2'-azobis(isobutyronitrile), t-butyl perbenzoate, 2-t-butylazo-2-cyanopropane, t-butyl peroctoate, and 1,1-bis(t-butylperoxy)3,3,5-trimethyl cyclohexane.

The preferred copolymer is polymerized from 48 to 63% styrene, 35 to 50% 2-ethylhexyl methacrylate, and 2 to 4% methacrylic acid.

The polymerization reaction is achieved by slowly adding the monomers and initiator to the hydrocarbon solvent previously heated to and maintained at an elevated temperature at which the monomers will react but below the boiling range of the solvent. This reaction temperature will vary with the particular solvent, the particular monomer components and ratio thereof, and the particular initiator. The reaction temperature range is about 250° to 350° F., preferably 280° to 330° F., although this varies considerably depending upon the initiator selected.

When the monomers are polymerized in the solvent to form the Polymer Solution of the sytrene-acylic copolymer, the solids content sought is 55-65% by weight monomer or polymer solids to 35 to 45% solvent. This range effects the usually desired viscosity and flow characteristics of an ink vehicle. The resulting vehicle is clear and readily pourable. These characteristics can be varied, e.g. to adjust the actual drying time of an ink, and/or to accommodate a particular copolymer formed from the components noted above, and/or to achieve a desired tack character, or for other reasons, by varying the solids content. Also, a small amount of the solvent can be added after the pigment is mixed with the Polymer Solution, as to adjust viscosity, as will be explained in more detail hereinafter.

Once the novel ink vehicle is prepared, it is further processed to form an ink. The ingredients added to form the ink are conventional, being largely the selected pigments of various colors including typically black, blue, red, and yellow. Thus, one or more conventional color pigments are dispersed uniformly in the vehicle using conventional blending techniques and equipment, to form a pigment concentrate containing typically 30-40% pigment.

To this pigment concentrate can be added minor amounts of other ingredients such as conventional waxes typically in amounts of about ½ to 2% of the total ink, other conventional specialty additives, and even additional solvent if desired, usually in amounts of 0–10% of the final ink to vary the thickness and viscosity of the ink.

The novel Polymer Solution can constitute all of the ink vehicle. Alternatively, a controlled amount of conventional ink vehicles can be mixed with the novel vehicle according to guidelines and for reasons set forth hereinafter.

To assure clarity of this disclosure, specific examples to illustrate preparation of and compositions of various forms of the novel heat-set ink vehicle are set forth below. A large number of experimental/developmental runs or cooks were made in developing the invention herein. These examples below are considered to be representative and to set forth the best mode of the ink vehicle and its preparation.

EXAMPLE 1

| | Ingredients | Parts By Wt. |
| --- | --- | --- |
| A. | Magie Sol 44 | 600 |
| B. | styrene | 545 |
| | 2-ethylhexyl methacrylate | 345 |
| | acrylic acid | 18 |
| | t-butyl perbenzoate | 15 |
| C. | t-butyl perbenzoate | 5 |

Procedure: Charge A into a reactor. Heat to 330° F. Add B dropwise over a three hour period, maintaining 330° F. Hold one hour. Add C. Hold two hours. Cool.

This particular composition was prepared after several experiments and exhibited excellent results as an ink vehicle.

EXAMPLE 2

| Ingredients | | Parts By Wt. |
|---|---|---|
| A. | Magie Sol 44 | 600 |
| B. | styrene | 545 |
| | 2-ethylhexyl methacrylate | 345 |
| | methacrylic acid | 18 |
| | cumene hydroperoxide | 50 |

Procedure: Charge A. Heat to 300° F. Add B dropwise over a three hour period maintaining 300° F. Hold three hours. Cool, filter.

This ink vehicle exhibited good characteristics, although it had an odor which was considered by some to be objectionable.

EXAMPLE 3

| Ingredients | | Parts By Wt. |
|---|---|---|
| A. | Magie Sol 47 | 600 |
| B. | styrene | 545 |
| | 2-ethylhexyl acrylate | 345 |
| | methacrylic acid | 18 |
| | cumene hydroperoxide | 50 |

Procedure: Charge A. Heat to 300° F. Add B dropwise over a three hour period, maintaining 300° F. Hold one hour. Heat to 350° F. Hold two hours. Cool, filter.

EXAMPLE 4

| Ingredients | | Parts By Wt. |
|---|---|---|
| A. | Magie Sol 44 | 600 |
| B. | styrene | 545 |
| | 2-ethylhexyl methacrylate | 245 |
| | vinyl toluene | 100 |
| | methacrylic acid | 18 |
| | t-butyl perbenzoate | 15 |
| C. | t-butyl perbenzoate | 2 |

Procedure: Charge A. Heat to 310° F. Add B dropwise over a three hour period, maintaining 310° F. Hold one hour. Add C. Hold two hours. Cool, filter.

EXAMPLE 5

| Ingredients | | Parts By Wt. |
|---|---|---|
| A. | Magie Sol 44 | 600 |
| B. | styrene | 300 |
| | 2-ethylhexyl methacrylate | 350 |
| | butyl methacrylate | 125 |
| | dicyclopentadiene acrylate | 100 |
| | methacrylic acid | 22 |
| | cumene hydroperoxide | 33 |

Procedure: Charge A. Heat to 300° F. Add B dropwise over a three hour period, maintaining 300° F. Hold three hours. Cool, filter.

EXAMPLE 6

| Ingredients | | Parts By Wt. |
|---|---|---|
| A. | Magie Sol 44 | 450 |
| B. | styrene | 409 |
| | 2-ethylhexyl methacrylate | 259 |
| | methacrylic acid | 14 |
| | 2-t-butylazo-2-cyanopropane | 26 |
| C. | 2-t-butylazo-2-cyanopropane | 4 |

Procedure: Charge A. Heat to 275° F. Add B over a three hour period, maintaining 275° F. Hold one hour. Add C. Hold two hours. Cool, filter.

EXAMPLE 7

| Ingredients | | Parts By Wt. |
|---|---|---|
| A. | Magie Sol 44 | 600 |
| B. | styrene | 545 |
| | 2-ethylhexyl methacrylate | 345 |
| | methacrylic acid | 18 |
| | 2,2'-azobis (isobutyronitrile) | 25 |
| C. | 2,2'-azobis (isobutyronitrile) | 5 |

Procedure: Charge A. Heat to 300° F. Add B dropwise over a three hour period, maintaining 300° F. Hold one hour. Add C. Hold two hours. Cool, filter.

EXAMPLE 8

| Ingredients | | Parts By Wt. |
|---|---|---|
| A. | Magie Sol 44 | 600 |
| B. | styrene | 545 |
| | 2-ethylhexyl methacrylate | 345 |
| | acrylic acid | 18 |
| | t-butyl perbenzoate | 15 |
| C. | t-butyl perbenzoate | 5 |

Procedure: Charge A. Heat to 330° F. Add B over a three hour period, maintaining 330° F. Hold one hour. Add C. Hold two hours. Cool, filter.

EXAMPLE 9

| Ingredients | | Parts By Wt. |
|---|---|---|
| A. | Magie Sol 44 | 346 |
| B. | isodecyl methacrylate | 73 |
| | n-hexyl acrylate | 135 |
| | styrene | 302 |
| | methacrylic acid | 10 |
| | t-butyl perbenzoate | 9 |
| C. | t-butyl perbenzoate | 1 |

Procedure: Charge A. Heat to 310° F. Add B continuously over a three hour period, maintaining 310° F. Hold one hour. Add C. Hold two hours. Cool, filter.

EXAMPLE 10

| Ingredients | | Parts By Wt. |
|---|---|---|
| A. | Magie Sol 535 | 600 |
| B. | styrene | 543 |
| | 2-ethylhexyl methacrylate | 344 |
| | methacrylic acid | 18 |
| | t-butyl perbenzoate | 15 |
| C. | t-butyl perbenzoate | 2 |

Procedure: Charge A. Heat to 310° F. Add B dropwise over a three hour period, maintaining 310° F. Hold one hour. Add C. Hold two hours. Cool, filter.

EXAMPLE 11

| Ingredients | | Parts By Wt. |
|---|---|---|
| A. | Magie Sol 44 | 500 |
| B. | styrene | 453 |
| | t-butyl styrene | 172 |
| | 2-ethylhexyl methacrylate | 115 |
| | methacrylic acid | 15 |
| | t-butyl perbenzoate | 12.5 |
| C. | t-butyl perbenzoate | 2.0 |

Procedure: Charge A. Heat to 310° F. Add B over a three hour period, maintaining 310° F. Hold one hour. Add C. Hold two hours. Cool, filter.

EXAMPLE 12

| Ingredients | | Parts By Wt. |
|---|---|---|
| A. | Magie Sol 44 | 500 |
| B. | styrene | 453 |
| | butyl methacrylate | 115 |
| | 2-ethylhexyl methacrylate | 172 |
| | methacrylic acid | 15 |
| | t-butyl perbenzoate | 12.5 |
| C. | t-butyl perbenzoate | 2.0 |

Procedure: Charge A. Heat to 310° F. Add B over a three hour period, holding at 310° F. Hold one hour. Add C. Hold two hours. Cool, filter.

EXAMPLE 13

| Ingredients | | Parts By Wt. |
|---|---|---|
| A. | Magie Sol 44 | 600 |
| B. | styrene | 300 |
| | methyl methacrylate | 100 |
| | ethyl acrylate | 50 |
| | 2-ethylhexyl methacrylate | 430 |
| | isobornyl acrylate | 100 |
| | methacrylic acid | 20 |
| | t-butyl perbenzoate | 18 |
| C. | t-butyl perbenzoate | 2 |

Procedure: Charge A. Heat to 290° F. Add B dropwise over a three hour period, holding at 290° F. Hold one hour. Add C. Hold two hours. Cool, filter.

EXAMPLE 14

| Ingredients | | Parts By Wt. |
|---|---|---|
| A. | Magie Sol 44 | 600 |
| B. | styrene | 545 |
| | 2-ethylhexyl methacrylate | 345 |
| | methacrylic acid | 18 |
| | t-butyl perbenzoate | 8 |
| C. | t-butyl perbenzoate | 1 |

Procedure: Charge A. Heat to 350° F. Add B dropwise over a three hour period. Hold one hour. Add C. Hold two hours. Cool, filter.

EXAMPLE 15

| Ingredients | | Parts By Wt. |
|---|---|---|
| A. | Magie Sol 44 | 600 |
| B. | styrene | 545 |
| | 2-ethylhexyl methacrylate | 345 |
| | methacrylic acid | 18 |
| | 1,1-bis(t-butylperoxy) 3,3,5-trimethyl cyclohexane | 12 |
| C. | 1,1-bis(t-butylperoxy) 3,3,5-trimethyl cyclohexane | 2 |

Procedure: Charge A. Heat to 325° F. Add B over a three hour period maintaining 325° F. Hold one hour at 325° F. Add C. Hold two hours at 325° F. Cool, filter.

EXAMPLE 16

| Ingredients | | Parts By Wt. |
|---|---|---|
| A. | Magie Sol 44 | 840.5 |
| B. | styrene | 760.3 |
| | 2-ethylhexyl methacrylate | 481.4 |
| | methacrylic acid | 25.1 |
| | t-butyl perbenzoate | 20.9 |
| C. | t-butyl perbenzoate | 2.9 |

Procedure: Charge A. Heat to 250° F. Add B dropwise over a three hour period. Hold one hour. Add C. Hold two hours. Cool, filter.

EXAMPLE 17

| Ingredients | | Parts By Wt. |
|---|---|---|
| A. | Magie Sol 44 | 560.3 |
| B. | styrene | 405.5 |
| | 2-ethylhexyl methacrylate | 385.1 |
| | methacrylic acid | 16.7 |
| | t-butyl perbenzoate | 14.0 |
| C. | t-butyl perbenzoate | 1.9 |

Procedure: Charge A. Heat to 310° F. Add B dropwise over three hours. Hold one hour. Add C. Hold two hours. Cool, filter.

EXAMPLE 18

| Ingredients | | Parts By Wt. |
|---|---|---|
| A. | Magie Sol 44 | 560.3 |
| B. | styrene | 405.5 |
| | methyl methacrylate | 101.4 |
| | 2-ethylhexyl methacrylate | 320.9 |
| | methacrylic acid | 16.7 |
| | t-butyl perbenzoate | 14.0 |
| C. | t-butyl perbenzoate | 1.9 |

Procedure: Charge A. Heat to 310° F. Add B dropwise over three hours. Hold one hour. Add C. Hold two hours. Cool, filter.

This sample exhibited a somewhat milky appearance, a characteristic not particularly desirable.

EXAMPLE 19

| Ingredients | | Parts By Wt. |
|---|---|---|
| A. | Magie Sol 44 | 560.3 |
| B. | styrene | 523.6 |
| | 2-ethylhexyl methacrylate | 320.9 |
| | t-butyl perbenzoate | 14.0 |
| C. | t-butyl perbenzoate | 1.9 |

Procedure: Charge A. Heat to 310° F. Add B dropwise over three hour period. Hold one hour. Add C. Hold two hours. Cool, filter.

EXAMPLE 20

| Ingredients | | Parts By Wt. |
|---|---|---|
| A. | Magie Sol 44 | 560.3 |
| B. | styrene | 329.5 |
| | 2-ethylhexyl methacrylate | 208.6 |
| | methacrylic acid | 10.9 |
| | t-butyl perbenzoate | 9.1 |
| C. | t-butyl perbenzoate | 1.2 |

Procedure: Charge A. Heat to 310° F. Add B dropwise over three hour period. Hold one hour. Add C. Hold two hours. Cool, filter.

EXAMPLE 21

| Ingredients | | Parts By Wt. |
|---|---|---|
| A. | Magie Sol 44 | 560.3 |
| B. | styrene | 777.4 |
| | 2-ethylhexyl methacrylate | 492.2 |
| | methacrylic acid | 25.6 |
| | t-butyl perbenzoate | 70.8 |
| C. | t-butyl perbenzoate | 2.4 |

Procedure: Charge A. Heat to 310° F. Add B dropwise over three hour period. Hold one hour. Add C. Hold two hours. Cool, filter.

EXAMPLE 22

| | Ingredients | Parts By Wt. |
|---|---|---|
| A. | Magie Sol 44 | 560.3 |
| B. | styrene | 506.9 |
| | 2-ethylhexyl methacrylate | 320.9 |
| | methacrylic acid | 50.1 |
| | t-butyl perbenzoate | 14.0 |
| C. | t-butyl perbenzoate | 1.9 |

Procedure: Charge A. Heat to 310° F. Add B dropwise over three hour period. Hold one hour. Add C. Hold. Cool, filter.

PREPARATION OF PIGMENT CONCENTRATE

The pigment concentrate comprises the novel ink vehicle into which is blended a sufficient quantity of one or more conventional pigments to achieve the desired color and color intensity. The amount of pigment will vary depending upon the pigment color involved, the desired final color, and other such factors well known in the printing trade. For example, preparation of a black ink using carbon black pigment could require much less pigment than yellow pigment for a bright yellow ink.

As a general guideline, the amount of pigment added will be in the range of about 43 to 67 parts by weight to 100 parts by weight of ink vehicle, to yield a concentrate containing 30-40% pigment.

PREPARATION OF INK

A remarkable factor learned is that the novel vehicle can be combined with a controlled amount of conventional let down vehicles without destroying the unique characteristics of added stability on the ink train and lower energy drying requirements. Experimentation has shown that the potential range of this combination is very large, with the novel vehicle having an effect in almost all combinations where the novel vehicle is greater than about 5% of the combination. Normally it should be greater than about 25%, i.e. 25-100% Polymer Solution to 0-75% conventional let down vehicle.

The effect of dilution of beneficial characteristics of the novel vehicle by blending with conventional low energy vehicles is low at concentrations of the novel vehicle over 25%. This feature enables the formulator to modify an ink to achieve desired print qualities without significant loss of the low drying temperature advantages of the novel material. The effects of varying these percentages are depicted in FIGS. 1-4 explained in more detail below.

As is known, the drying rate of heat-set inks is dependent on the temperature of the ink film, the time of exposure (dwell time), the evaporation potential of the solvent system, and the rate of solvent release (solubility) of the resin system. The novel vehicle is unique among heat-set ink vehicles in that it exhibits an increasing rate of drying compared to conventional low energy heat-set ink systems as the solvent concentration in the ink film decreases. Yet at room temperature this rate is reversed, such that its rate of solvent loss is not as fast as that of a conventional system. Thus the novel vehicle surprisingly exhibits good press stability in the roller train while having the property of accelerated solvent release as the film temperature is increased. The rate at which this acceleration occurs is such that it rapidly surpasses a conventional vehicle at lower drying temperatures than conventionally required.

The FIGS. 1-4 illustrate the unique drying features of the vehicle when compared to or blended with conventional low energy vehicles. In developing these charts, prints were dried on the heat saddle at four specific temperatures (250°, 200°, 180°, and 150°) and the number of seconds dwell time for the film to achieve a "tack free" state was determined.

Figure 2:
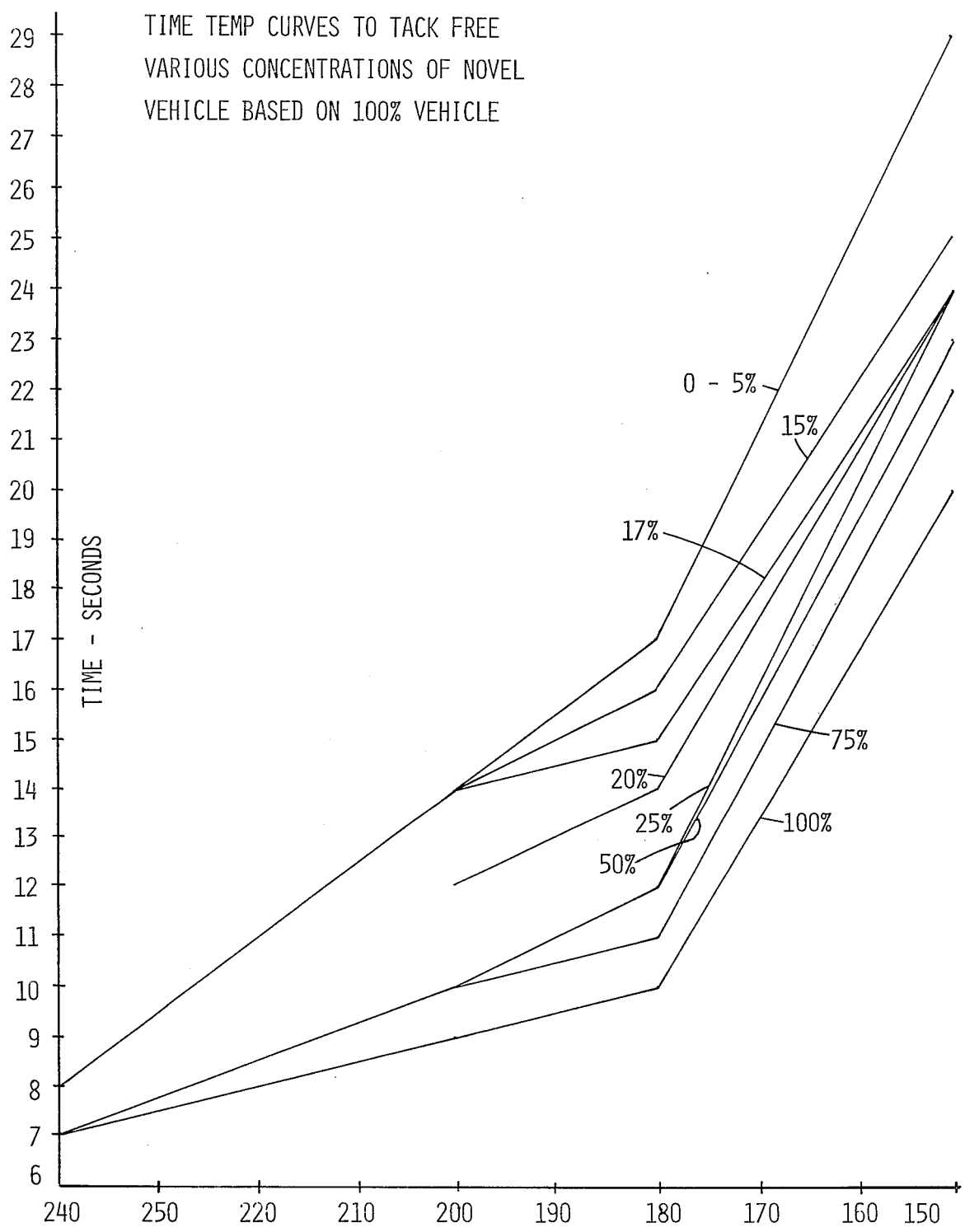

FIGS. 1 and 2 show that the novel vehicle has an inherently faster drying rate than a conventional vehicle at all temperatures between 150° F. and 250° F. No heat-set values were determined below 150° F.

FIG. 1 shows that between 180° and 250° F. 100% novel vehicle will dry approximately three times faster than a conventional system. At a dilution of 50% novel vehicle to 50% conventional vehicle the system will still be twice as fast drying as the conventional vehicle alone. Between 150° and 180° F. all systems show a marked increase in the dwell time required for a tack free film as the temperature is reduced. The 100% novel vehicle and modified 50% vehicles continue to show a drying rate which is only ⅔ to ¾ as long as that of the conventional system at a given web surface temperature.

FIG. 2 depicts drying rate curves for six other concentration levels of novel vehicle (5%, 15%, 17%, 20%, 25%, 75%). This illustrates that at all temperatures below 200° F. concentrations as little as 15% novel vehicle improve the drying rate, while a concentration of at least 20% is needed to effect a faster dry than conventional vehicle at temperatures above 200° F.

Figure 3:
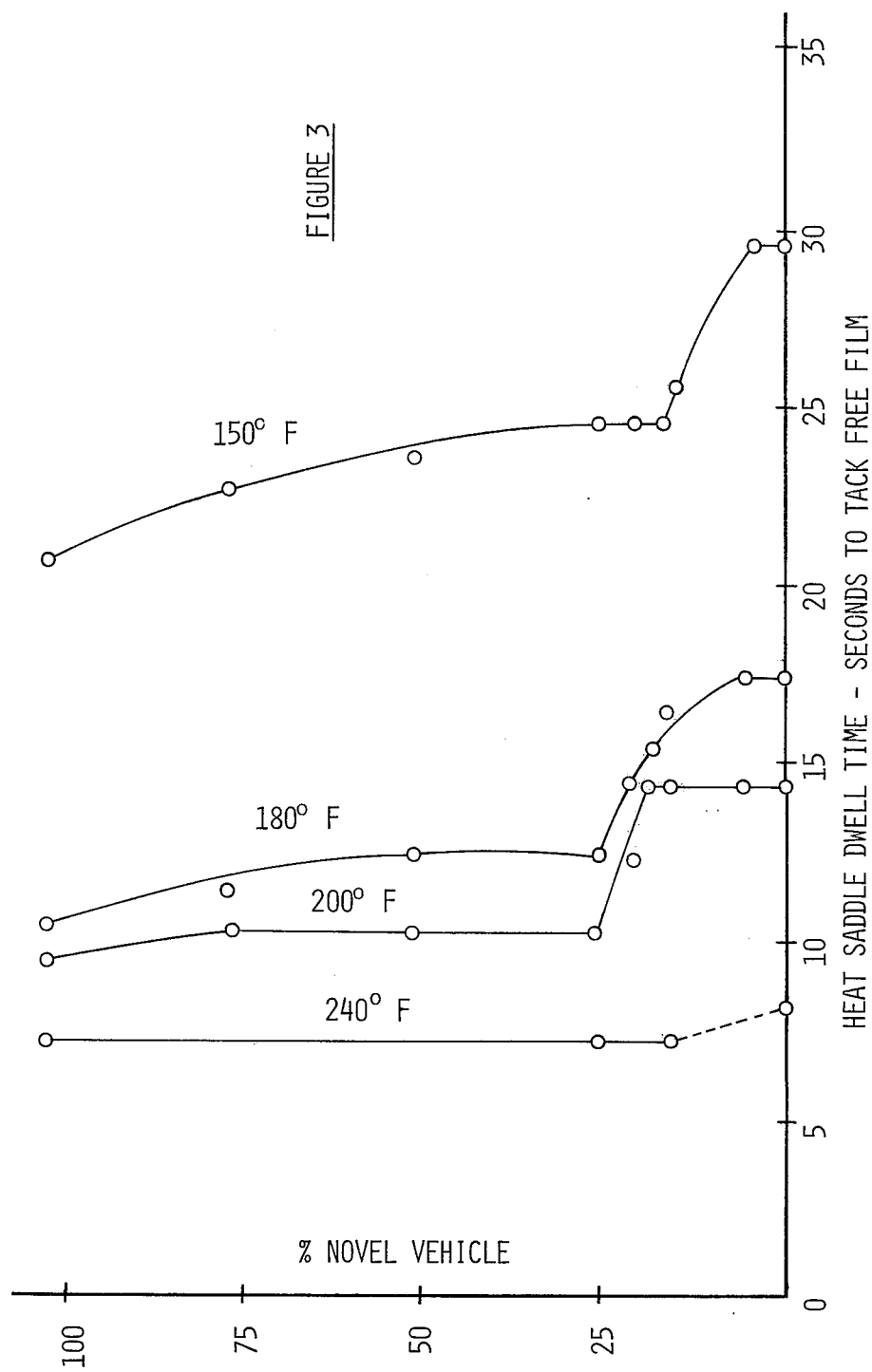

FIG. 3 shows the same data as FIGS. 1 and 2 expressed as constant temperature graphs. It shows that at any given web temperature below 250° F., the presence of as little as 20 to 25% novel vehicle will have a significant effect on the dwell time required to achieve a "tack free" print. It also shows that it has superior drying capabilities throughout the web temperature range of 150° F. to 250° F. From this it can be seen that continued improvement in the drying rate over conventional vehicles can be expected as the novel vehicle concentration is increased toward 100%, especially as the web temperature approaches 150° F.

Figure 4:
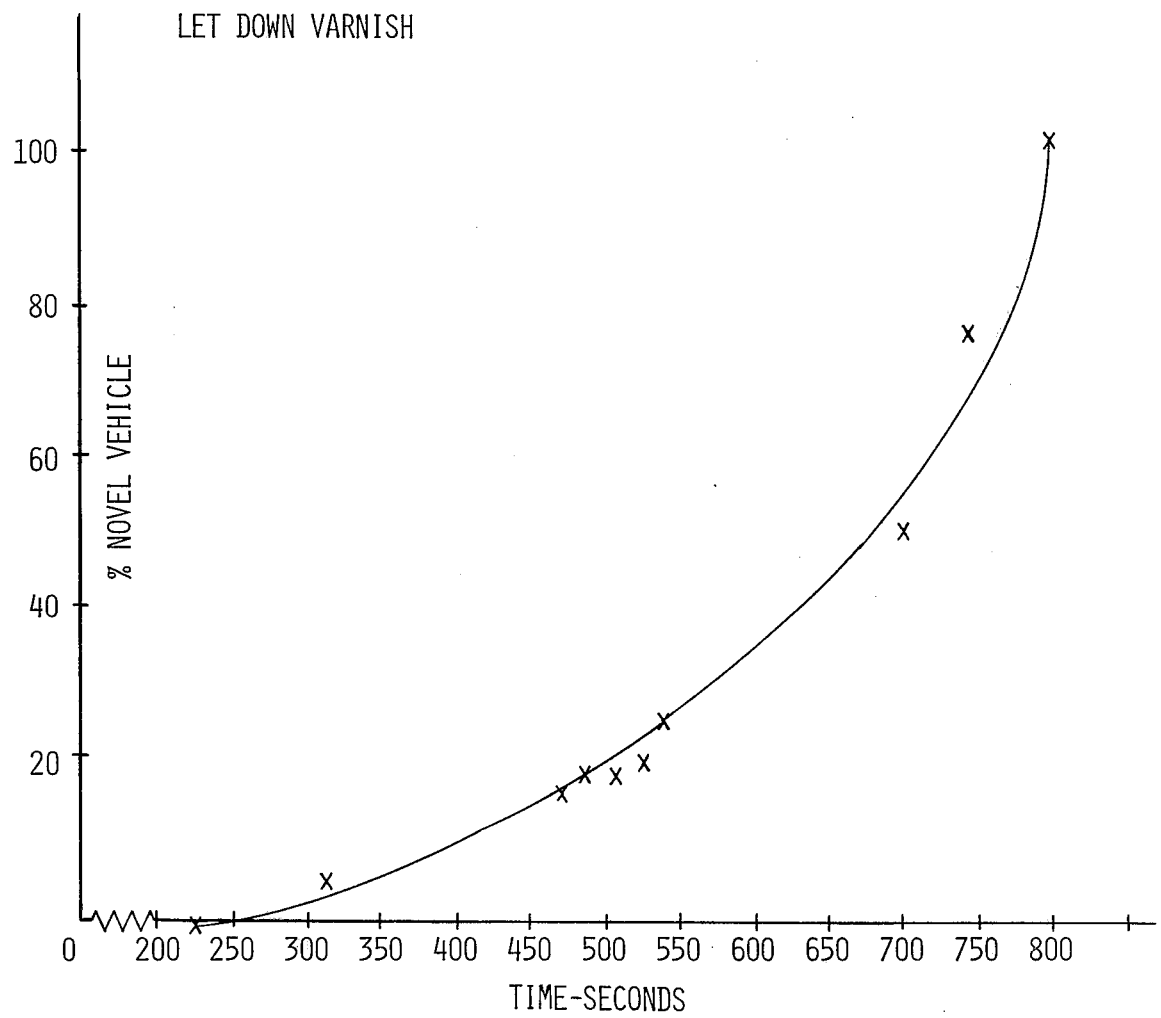

FIG. 4 shows the time required for the novel vehicle to achieve a tack free (dry) state at room temperature as compared to a conventional vehicle. Again various concentrations were used in developing this data. The curve in FIG. 4 shows that the novel vehicle has greater stability at room temperature than a conventional vehicle. This indicates that the novel vehicle has slower solvent release (greater solubility) in the solvents used than a conventional vehicle. Systems containing the novel vehicle have a greater potential for being "rewet" by the addition of fresh solvent by the ink feed on the press, thus maintaining their stability in the ink train.

The conventional vehicle used for these tests depicted in the Figures was a gel composed of hydrocarbon and phenolic resins in Magie Sol 47. Other conventional heat-set let down vehicles are basically comparable. Conventional heat-set vehicles referred to are those common to the trade and are combinations of alkyds (such as Lawter 1666 or the Terlons), maleic esters (such as Pentalyn K), phenolics or rosin modified phenolics (such as Pentalyn 802A) or hydrocarbon resins (such as Picco 6140-3). Often times aluminum octoate or chelate gels are prepared from combinations of these resins. In the trade, various companies have proprietary products of these types. Examples are:
Var Chem Co.:

"Var Therm" 517 HLG
"Var Therm" 521 HLG
"Var Therm" 529 HLG
Superior Varnish Co.:
  3828
  3668
  4258
Degen Oil Co.:
  #610 Gloss Heatset Gel
  #622 Gloss Heatset Gel
  #641 Gloss Heatset Gel
  #655 Gloss Heatset Gel
Lawter Varnish Co.:
  "Thermex" A6E Gel Varnish
  "LoCal" GP-17
  "LoCal" G-47
  1823 Gloss Heatset Gel The amounts of the wax and other additives in the ink can vary considerably. The typical additives are natural and/or synthetic waxes, polyethylene or Teflon powders of which the following are specific representative examples:

Shamrock Chemicals:
  "S-379 N"
  "S-394"
  "SST-2"
Micro Powders:
  "MP-22"
Plastomer Products:
  "#225 Plastolon"

The overall composition of the total ink is generally within the following ranges:

| | |
|---|---|
| Vehicle: | 70% to 90% |
| Pigment(s): | 10% to 25% |
| Waxes: | 0 to 5% |
| Other additives | |
| (a) Talc: | 0 to 5% |
| (b) Tridecanol: | 0 to 2% |
| (c) Fumed Silica: | 0 to 2% |

And, as noted previously, additional solvent may be incorporated to adjust flow, body, tack, and stability.

It will be apparent from the above disclosure that the novel ink vehicle and ink can be varied considerably in composition within the guidelines presented, to suit a particular printing application. It is intended that this invention is to be limited only by the scope of the appended claims and the reasonable equivalents thereto, rather than to the specific embodiments set forth herein as illustrative of the invention.

The embodiments of the invention in which an exclusive property or privilege is claimed are defined as follows.

1. A printing ink vehicle comprising 50–70% by weight polymer solids in 30 to 50% of an essentially aliphatic hydrocarbon solvent boiling between 390°–595° F., such solids being prepared from monomers polymerized to a resin having a molecular weight in the range of 4,000 to 50,000, such monomers comprising:
  30–63% styrene, and 37 to 70% of acrylates and methacrylates of which at least 25% are monomers having at least $C_6$ alkyl chain length.

2. A printing ink vehicle comprising 50–70% by weight polymer solids in 30 to 50% of an essentially aliphatic hydrocarbon solvent boiling between 390°–595° F., such polymer solids being prepared from monomers of about 30–63% styrene, and about 37 to 70% of the following components, of which at least 25% are acrylates and methacrylate monomers having at least $C_6$ alkyl chain length:
  0–48% 2-ethylhexyl methacrylate
  0–40% of other esters of methacrylic or acrylic acid
  0–6% methacrylic or acrylic acid, and
  0–20% of an alkyl vinyl benzene such monomers being polymerized to a resin having a molecular weight in the range of 4,000 to 50,000.

3. A printing ink vehicle comprising a polymer solution having a molecular weight in the range of 5,000 to 10,000 and polymerized from the following components:
  55–65% by weight monomer solids in 35 to 45% of a saturated aliphatic hydrocarbon solvent boiling between 440°–500° F., with 80% boiling below 475° F., such monomer solids being composed of:
    50–63% styrene, and 37 to 50% of the following components:
      35 to 48% 2-ethylhexyl methacrylate
      2 to 4% methacrylic acid.

4. The printing ink vehicle in claim 3 wherein said monomers are polymerized at an elevated temperature with a free radical initiator.

5. The printing ink vehicle in any of claims 1–3 wherein said monomers are polymerized with a free radical initiator comprising at least one of the groups consisting of cumene hydroperoxide, 2-2'-azobis (isobutyronitrile), t-butyl perbenzoate, 2-t-butylazo-2-cyanopropane, t-butyl peroctoate, and 1,1-bis (t-butyl peroxy) 3,3,5-trimethyl cyclohexane.

6. A unique low temperature drying printing ink for offset lithography comprising a combination of the vehicle in one of claims 1–3 and pigment colorant.

7. A low temperature drying printing ink having good press stability, comprising color pigment and minor amounts of other conventional additives in a vehicle comprising 50–70% by weight copolymer solids in 30 to 50% of an essentially aliphatic hydrocarbon solvent boiling between 390°–595° F., such copolymer solids being a resin having a molecular weight in the range of 4,000 to 50,000 polymerized from 30–63% styrene, and 37 to 70% of acrylates and methacrylates of which at least 25% are monomers having at least $C_6$ alkyl chain length.

8. A printing ink comprising color pigment in a vehicle comprising 50–70% by weight polymer solids in 30 to 50% of an essentially aliphatic hydrocarbon solvent boiling between 390°–595° F., such polymer solids comprising a resin having a molecular weight in the range of 4,000 to 50,000 polymerized from about 30–63% styrene, and about 37 to 70% of the following components, of which at least 25% are acrylates and methacrylate monomers having at least $C_6$ alkyl chain length:
  0–48% 2-ethylhexyl methacrylate
  0–40% of other esters of methacrylic or acrylic acid
  0–6% methacrylic or acrylic acid, and
  0–20% of an alkyl vinyl benzene.

9. A printing ink comprising color pigment in a polymer solution having a molecular weight in the range of 5,000 to 10,000 and polymerized from the following components:
  55–65% by weight monomer solids in 35 to 45% of a saturated aliphatic hydrocarbon solvent boiling between 440°–500° F., with 80% boiling below 475° F., such monomer solids being composed of:

50–63% styrene, and 37 to 50% of the following components:
35 to 48% 2-ethylhexyl methacrylate
2 to 4% methacrylic acid.

10. A method of preparing a printing ink vehicle comprising preparing a polymer solution of 50–70% by weight polymer solids in 30 to 50% of an essentially aliphatic hydrocarbon solvent boiling between 390°–595° F., such solids being formed by combining:
30–63% styrene, and 37 to 70% of acrylates and methacrylates of which at least 25% are monomers having at least $C_6$ alkyl chain length, and polymerizing such monomers to a resin having a molecular weight in the range of 4,000 to 50,000.

11. A method of preparing a printing ink vehicle comprising preparing a polymer solution of 50–70% by weight polymer solids in 30 to 50% of an essentially aliphatic hydrocarbon solvent boiling between 390°–595° F., such polymer solids being formed by combining about 30–63% styrene, and about 37 to 70% of the following components, of which at least 25% are acrylates and methacrylate monomers having at least $C_6$ alkyl chain length:
0–48% 2-ethylhexyl methacrylate
0–40% of other esters of methacrylic or acrylic acid
0–6% methacrylic or acrylic acid, and
0–20% of an alkyl vinyl benzene and polymerizing such monomers to a resin having a molecular weight in the range of 4,000 to 50,000.

12. The method of preparing a printing ink vehicle in claim 11 comprising polymerizing the monomers to a polymer solution having a molecular weight in the range of 5,000 to 10,000 from the following components:
55–65% by weight monomer solids in 35 to 45% of a saturated aliphatic hydrocarbon solvent boiling between 440°–500° F., with 80% boiling below 475° F., such monomer solids being composed of:
50–63% styrene, and 37 to 50% of the following components:
35 to 48% 2-ethylhexyl methacrylate
2 to 4% methacrylic acid.

13. The method of preparing the printing ink vehicle in claim 12 wherein said monomers are polymerized at an elevated temperature with a free radical initiator.

14. The method of preparing a printing ink vehicle in any of claims 10–13 wherein said monomers are polymerized with a free radical initiator comprising at least one of the group consisting of cumene hydroperoxide, 2-2'-azobis (isobutyronitrile), t-butyl perbenzoate, 2-t-butylazo-2-cyanopropane, t-butyl peroctoate, and 1,1-bis (t-butyl peroxy) 3,3,5-trimethyl cyclohexane.

* * * * *